United States Patent
Li et al.

(10) Patent No.: US 10,885,203 B2
(45) Date of Patent: Jan. 5, 2021

(54) ENCRYPTED DATA EXCHANGE

(71) Applicant: Advanced New Technologies Co., Ltd., Grand Cayman (KY)

(72) Inventors: Lichun Li, Hangzhou (CN); Wenzhen Lin, Hangzhou (CN); Shan Yin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/778,989

(22) Filed: Jan. 31, 2020

(65) Prior Publication Data

US 2020/0175178 A1 Jun. 4, 2020

Related U.S. Application Data

(63) Continuation of application No. PCT/CN2020/071355, filed on Jan. 10, 2020.

(30) Foreign Application Priority Data

Aug. 1, 2019 (CN) .......................... 2019 1 0706736

(51) Int. Cl.
*G06F 21/60* (2013.01)
*H04L 9/06* (2006.01)
(Continued)

(52) U.S. Cl.
CPC .............. *G06F 21/60* (2013.01); *H04L 9/008* (2013.01); *H04L 9/0643* (2013.01); *H04L 63/0428* (2013.01)

(58) Field of Classification Search
CPC ...... G06F 21/60; H04L 9/008; H04L 63/0428
See application file for complete search history.

(56) References Cited

FOREIGN PATENT DOCUMENTS

| CN | 105099653 | 11/2015 |
|---|---|---|
| CN | 105794145 | 7/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Paul E Callahan
(74) *Attorney, Agent, or Firm* — Fish & Richardson P.C.

(57) ABSTRACT

A computer-implemented method includes: encrypting, by a first data party, identification data to generate a first identification data ciphertext, in which the first data party holds an identification dataset including the identification data; sending a first ciphertext set to a second data party, in which the first ciphertext set includes the first identification data ciphertext; receiving a second ciphertext set from the second data party; decrypting the second identification data ciphertext to generate a third identification data ciphertext, in which a third ciphertext set includes the third identification data ciphertext; receiving a fourth ciphertext set from the second data party, obtaining the third identification data ciphertext common to the third ciphertext set and the fourth ciphertext set; calculating a homomorphic addition result of the business data ciphertext corresponding to the third identification data ciphertext; and sending the homomorphic addition result to the second data party.

18 Claims, 7 Drawing Sheets

(51) Int. Cl.
H04L 9/00 (2006.01)
H04L 29/06 (2006.01)

(56) References Cited

FOREIGN PATENT DOCUMENTS

| | | | | |
|---|---|---|---|---|
| CN | 110535622 | | 12/2017 | |
| CN | 108055118 | | 5/2018 | |
| CN | 108463827 | | 8/2018 | |
| CN | 109525386 | * | 3/2019 | ............ G06F 21/60 |
| CN | 110622165 | | 12/2019 | |
| CN | 104468612 | | 3/2020 | |
| EP | 3340152 | | 6/2018 | |
| WO | WO 2017160317 | | 9/2017 | |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln No. PCT/CN2020/071355, dated Apr. 17, 2020, 19 pages (with English translation).

* cited by examiner

US 10,885,203 B2

ENCRYPTED DATA EXCHANGE

CROSS-REFERENCE TO RELATED APPLICATIONS

This application is a continuation of PCT Application No. PCT/CN2020/071355, filed on Jan. 10, 2020, which claims priority to Chinese Patent Application No. 201910706736.3, filed on Aug. 1, 2019, and each application is hereby incorporated by reference in its entirety.

TECHNICAL FIELD

Implementations of the present specification relate to the field of computer technologies, and in particular to a data processing method and apparatus, and an electronic device.

BACKGROUND

In business practice, data held by a single data party is incomplete, and usually needs to be used with data of other data parties to jointly complete statistics calculation on some data indicators. In the statistics calculation process, data leakage often occurs.

SUMMARY

An objective of implementations of the present specification is to provide a data processing method and apparatus, and an electronic device so that various data parties can jointly complete data indicator statistics without leaking their own data.

To achieve the previous objective, one or more implementations of the present specification provide the following technical solutions:

According to a first aspect of one or more implementations of the present specification, a data processing method is provided, where the method is applied to a first data party holding an identification dataset, the identification dataset includes at least one piece of identification data, and the method includes the following: encrypting identification data, and using an encryption result as a first identification data ciphertext in a first ciphertext set; sending the first ciphertext set to a second data party; receiving a second ciphertext set from the second data party, where the second ciphertext set includes at least one second identification data ciphertext, and the second identification data ciphertext is obtained by encrypting the first identification data ciphertext; decrypting the second identification data ciphertext, and using a decryption result as a third identification data ciphertext in a third ciphertext set; receiving a fourth ciphertext set from the second data party, where the fourth ciphertext set includes at least one ciphertext subset, the ciphertext subset includes the third identification data ciphertext and a business data ciphertext, and the business data ciphertext includes a homomorphic ciphertext; obtaining the third identification data ciphertext common to the third ciphertext set and the fourth ciphertext set; calculating a homomorphic addition result of a business data ciphertext corresponding to the common third identification data ciphertext; and sending the homomorphic addition result to the second data party.

According to a second aspect of one or more implementations of the present specification, a data processing method is provided, where the method is applied to a second data party holding a business dataset, the business dataset includes at least one plaintext subset, the plaintext subset includes identification data and business data, and the method includes the following: generating a first ciphertext set, where the first ciphertext set includes at least one ciphertext subset, the ciphertext subset includes a first identification data ciphertext and a business data ciphertext, the first identification data ciphertext is obtained by encrypting the identification data, and the business data ciphertext is obtained by encrypting the business data by a homomorphic encryption algorithm; sending the first ciphertext set to a first data party; receiving a homomorphic addition result of a specific business data ciphertext from the first data party; and decrypting the homomorphic addition result to obtain a statistical indicator.

According to a third aspect of one or more implementations of the present specification, a data processing apparatus is provided, where the apparatus is applied to a first data party holding an identification dataset, the identification dataset includes at least one piece of identification data, and the apparatus includes the following: an encryption unit, configured to encrypt identification data, and use an encryption result as a first identification data ciphertext in a first ciphertext set; a first sending unit, configured to send the first ciphertext set to a second data party; a first receiving unit, configured to receive a second ciphertext set from the second data party, where the second ciphertext set includes at least one second identification data ciphertext, and the second identification data ciphertext is obtained by encrypting the first identification data ciphertext; a decryption unit, configured to decrypt the second identification data ciphertext, and use a decryption result as a third identification data ciphertext in a third ciphertext set; a second receiving unit, configured to receive a fourth ciphertext set from the second data party, where the fourth ciphertext set includes at least one ciphertext subset, the ciphertext subset includes the third identification data ciphertext and a business data ciphertext, and the business data ciphertext includes a homomorphic ciphertext; an acquisition unit, configured to obtain the third identification data ciphertext common to the third ciphertext set and the fourth ciphertext set; a calculation unit, configured to calculate a homomorphic addition result of a business data ciphertext corresponding to the common third identification data ciphertext; and a second sending unit, configured to send the homomorphic addition result to the second data party.

According to a fourth aspect of one or more implementations of the present specification, a data processing apparatus is provided, where the apparatus is applied to a second data party holding a business dataset, the business dataset includes at least one plaintext subset, the plaintext subset includes identification data and business data, and the apparatus includes the following: a generation unit, configured to generate a first ciphertext set, where the first ciphertext set includes at least one ciphertext subset, the ciphertext subset includes a first identification data ciphertext and a business data ciphertext, the first identification data ciphertext is obtained by encrypting the identification data, and the business data ciphertext is obtained by encrypting the business data by a homomorphic encryption algorithm; a sending unit, configured to send the first ciphertext set to a first data party; a receiving unit, configured to receive a homomorphic addition result of a specific business data ciphertext from the first data party; and a decryption unit, configured to decrypt the homomorphic addition result to obtain a statistical indicator.

According to a fifth aspect of one or more implementations of the present specification, an electronic device is provided, where the electronic device includes the following: a memory, configured to store a computer instruction;

and a processor, configured to execute the computer instruction to implement the method step according to the first aspect.

According to a sixth aspect of one or more implementations of the present specification, an electronic device is provided, where the electronic device includes the following: a memory, configured to store a computer instruction; and a processor, configured to execute the computer instruction to implement the method step according to the second aspect.

As can be seen from the technical solutions provided in the previous implementations of the present specification, in some implementations of the present specification, the first data party and the second data party can jointly complete data indicator statistics without leaking their own data.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Figure 1:
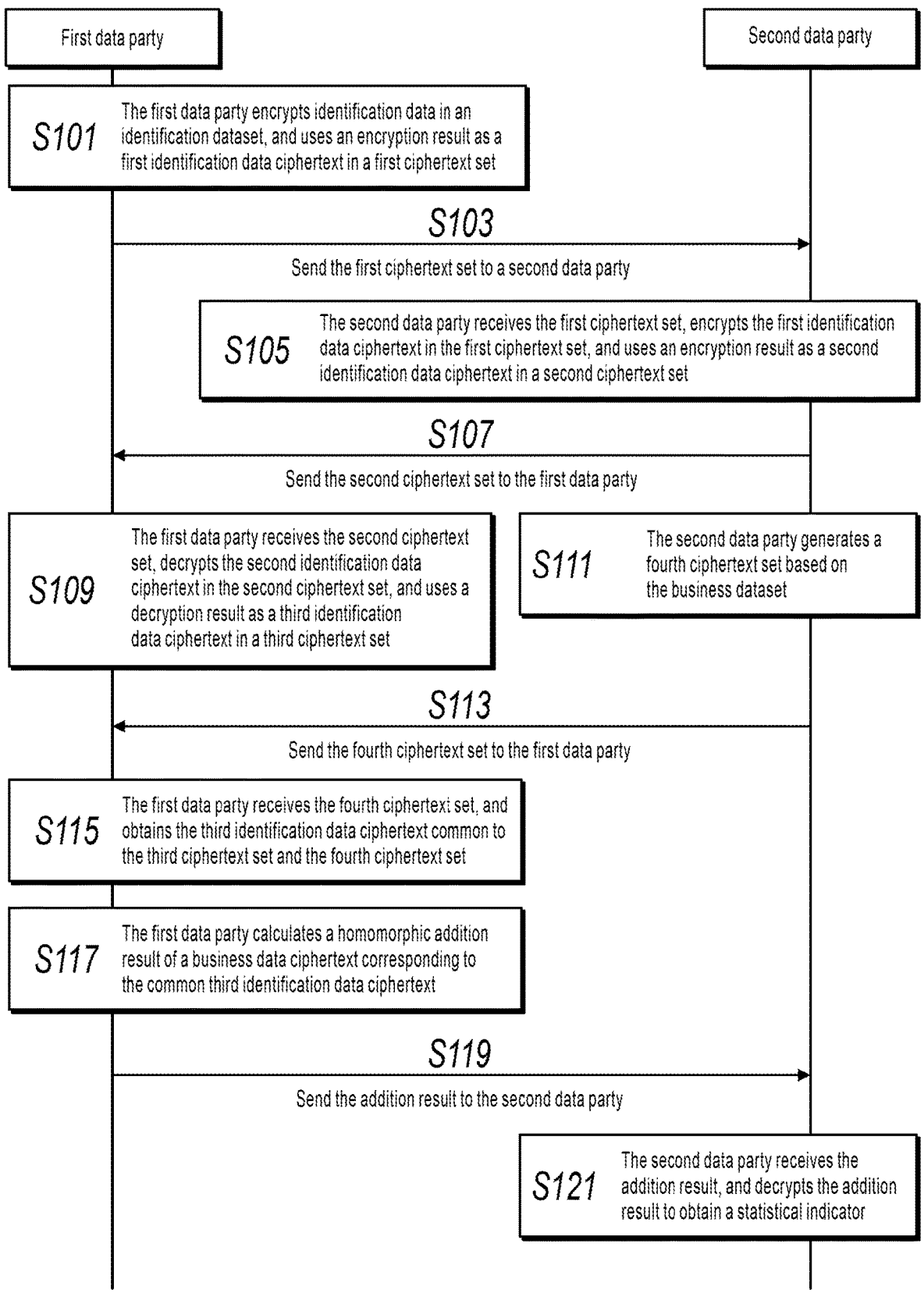
FIG. 1 is a flowchart illustrating a data processing method, according to an implementation of the present specification.

The following clearly describes the technical solutions in some implementations of the present specification with reference to the accompanying drawings in some implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

In the related technology, an intersection set of data held by a plurality of data parties can be obtained based on the Private Set Intersection (PSI) protocol, and then statistics on data indicators can be calculated based on the intersection set. There are many implementation solutions for the PSI protocol. The inventor finds that security of these implementation solutions is not high, and data is easily leaked.

Homomorphic encryption is an encryption technology which allows direct operation on ciphertext data to obtain an encrypted result. A result obtained by decrypting the encrypted result is the same as a result obtained by performing the same operation on plaintext data. Algorithms for implementing homomorphic encryption can include the Paillier algorithm, the Okamoto-Uchiyama algorithm, the Damgard-Jurik algorithm, etc.

The implementations of the present specification provide a data processing system. The data processing system can include a first data party and a second data party, which can be two parties that complete data indicator statistics, respectively. The data parties can be electronic devices. The electronic devices can include a personal computer, a server, a handheld device, a portable device, a tablet device, and a multi-processor apparatus, or can further include a cluster of any apparatuses or devices described above, etc.

In some implementations, the first data party can hold an identification dataset. The identification dataset can include at least one piece of identification data, which can be used to identify business data. For example, the identification data can be an identity card number and the business data can be a deposit amount. The second data party can hold a business dataset. The business dataset can include at least one subset (hereinafter referred to as a plaintext subset in order to distinguish from a ciphertext subset in the following). The plaintext subset can include identification data and business data having a mapping relationship. The correspondence between identification data and business data here can be understood as follows: The identification data is used to identify the business data.

In some implementations, identification data in the identification dataset and the business dataset can be identical or partially identical. By interacting with the first data party, the second data party can obtain a statistical indicator. The statistical indicator can include the sum of specific business data. The specific business data can include business data corresponding to identification data common to the business dataset and the identification dataset. In such process, the first data party cannot leak its own identification dataset, and the second data party cannot leak its own business dataset. For example, the first data party can hold partial identity card numbers, and the second data party can hold complete identity card numbers and their corresponding deposit amounts. Then, the statistical indicator can include the sum of deposit amounts corresponding to the identity card numbers held by the first data party.

References are made to FIG. 1. The present specification provides an implementation of a data processing method. The implementation can include the following steps.

S101: A first data party encrypts identification data in an identification dataset, and uses an encryption result as a first identification data ciphertext in a first ciphertext set.

In some implementations, the identification dataset can include at least one piece of identification data. The first data party can generate a first encryption key; can encrypt each piece of identification data in the identification dataset by using an encryption algorithm based on the first encryption key; and can use an encryption result as a first identification data ciphertext in a first ciphertext set.

The encryption algorithm can have a property of exchangeability or certainty. Exchangeability means that plaintext data is iteratively encrypted by using the encryption algorithm based on two or more encryption keys, and an encryption result is the same as an encryption result of iteratively encrypting the plaintext data based on the two or more encryption keys whose sequence is changed. For example, the plaintext data A is iteratively encrypted by using the encryption algorithm based on the encryption keys $k_1$ and $k_2$ to obtain the encryption result $E_{k_1}(E_{k_2}(A))$. The plaintext data A is iteratively encrypted by using the encryption algorithm based on the encryption keys $k_2$ and $k_1$ to obtain the encryption result $E_{k_2}(E_{k_1}(A))$. Therefore, $E_{k_1}(E_{k_2}(A))=E_{k_2}(E_{k_1}(A))$. Certainty means that the encryption algorithm is used to encrypt the same plaintext data for a plurality of times, and a plurality of obtained encryption results are the same.

The encryption algorithm can include a symmetric encryption algorithm and an asymmetric encryption algorithm. When the encryption algorithm is a symmetric encryption algorithm, the first data party can generate an encryption key as a first encryption key, and a decryption key corresponding to the first encryption key can be the first encryption key itself. When the encryption algorithm is an asymmetric encryption algorithm, the first data party can generate a public/private key pair, and can use the public key in the public/private key pair as a first encryption key, and use the private key in the public/private key pair as a decryption key corresponding to the first encryption key.

The encryption algorithm can be a homomorphic encryption algorithm, or can be a non-homomorphic encryption algorithm.

In some implementations, in order to increase security and alleviate obvious regularity between different encryption results, the first data party can obtain a code of identification data in the identification dataset; can encrypt the code of the identification data; and can use an encryption result as a first identification data ciphertext in the first ciphertext set. The code can include, for example, a hash value, including but not limited to MD5, SHA1, SHA256, SHA384, SHA512, CRC32, etc. Certainly, the code can also include a code in another form, which is not specifically limited in the present implementation.

S103: The first data party sends the first ciphertext set to a second data party.

In some implementations, the first data party can directly send the first ciphertext set to the second data party.

In some implementations, in order to increase security and prevent the second data party from learning a location relationship between first identification data ciphertexts in the first ciphertext set, the first data party can further disorder the first identification data ciphertexts in the first ciphertext set to obtain an out-of-order first ciphertext set; and can send the out-of-order first ciphertext set to the second data party.

S105: The second data party receives the first ciphertext set, encrypts the first identification data ciphertext in the first ciphertext set, and uses an encryption result as a second identification data ciphertext in a second ciphertext set.

In some implementations, the first data party can directly send the first ciphertext set to the second data party, and the second data party can receive the first ciphertext set. Or, the first data party can further send the out-of-order first ciphertext set to the second data party, and the second data party can receive the out-of-order first ciphertext set.

In some implementations, the second data party can generate a second encryption key; can encrypt each first identification data ciphertext in the first ciphertext set by using the encryption algorithm based on the second encryption key; and can use an encryption result as the second identification data ciphertext in the second ciphertext set. It is worthwhile to note that, because the second identification data ciphertext is obtained by encrypting the first identification data ciphertext, the second identification data ciphertext is a ciphertext after second-time encryption.

The encryption algorithm can include a symmetric encryption algorithm and an asymmetric encryption algorithm. When the encryption algorithm is a symmetric encryption algorithm, the second data party can generate an encryption key as a second encryption key, and a decryption key corresponding to the second encryption key can be the second encryption key itself. When the encryption algorithm is an asymmetric encryption algorithm, the second data party can generate a public/private key pair, and can use the public key in the public/private key pair as a second encryption key, and use the private key in the public/private key pair as a decryption key corresponding to the second encryption key.

The encryption algorithm used by the second data party can be the same as the encryption algorithm used by the first data party in S101.

S107: The second data party sends the second ciphertext set to the first data party.

In some implementations, the second data party can directly send the second ciphertext set to the first data party.

In some implementations, in order to increase security and prevent the first data party from learning a location relationship between second identification data ciphertexts in the second ciphertext set, the second data party can further disorder the second identification data ciphertexts in the second ciphertext set to obtain an out-of-order second ciphertext set; and can send the out-of-order second ciphertext set to the first data party.

S109: The first data party receives the second ciphertext set, decrypts the second identification data ciphertext in the second ciphertext set, and uses a decryption result as a third identification data ciphertext in a third ciphertext set.

In some implementations, the second data party can directly send the second ciphertext set to the first data party, and the first data party can receive the second ciphertext set. Or, the second data party can further send the out-of-order second ciphertext set to the first data party, and the first data party can receive the out-of-order second ciphertext set.

In some implementations, the first data party can decrypt each second identification data ciphertext in the second ciphertext set based on a decryption key corresponding to the first encryption key; and can use a decryption result as the third identification data ciphertext in the third ciphertext set. It is worthwhile to note that, the third identification data ciphertext is obtained by decrypting the second identification data ciphertext. Because the second identification data ciphertext is a ciphertext after second-time encryption, the third identification data ciphertext is a ciphertext after first-time encryption. In addition, because the encryption algorithm used by the first data party in S101 (that is, the encryption algorithm used by the second data party in S105) is exchangeable, the decryption result of decrypting the second identification data ciphertext is the same as the encryption result of encrypting the identification data held by the first data party based on the second encryption key. Therefore, the first data party can obtain the third identification data ciphertext in the third ciphertext set without leaking its own identification dataset, that is, obtain the encryption result of encrypting its own identification data based on the second encryption key.

In some implementations, considering the relatively large number of bits of the decryption result, if the decryption result is directly used as the third identification data ciphertext in the third ciphertext set, the storage of the third ciphertext set will occupy more storage space, and time overheads will increase when the first data party calculates the intersection set (for a specific process, references are made to S115 in the following). For such reason, the first data party can decrypt each second identification data ciphertext in the second ciphertext set based on a decryption key corresponding to the first encryption key; can obtain a code of a decryption result; and can use the code of the decryption result as the third identification data ciphertext in the third ciphertext set. The code can include, for example, a hash value, including but not limited to MD5, SHA1, SHA256, SHA384, SHA512, CRC32, etc. Certainly, the code can also include a code in another form, which is not specifically limited in the present implementation. The number of bits in the code of the decryption result is smaller than the number of bits of the decryption result, so that the number of bits of the third identification data ciphertext in the third ciphertext set can be reduced. For example, due to limitation of a security demand, the number of bits of the decryption result is at least 256, and the number of bits in a hash value of the decryption result can be 80.

S111: The second data party generates a fourth ciphertext set based on the business dataset.

In some implementations, the business dataset can include at least one plaintext subset, which can include identification data and business data having a mapping relationship. The fourth ciphertext set can include at least one ciphertext subset, and each ciphertext subset can include a third identification data ciphertext and a business data ciphertext having a mapping relationship.

In some implementations, the second data party can generate a third encryption key. The second data party can encrypt identification data in each plaintext subset by using an encryption algorithm based on the second encryption key, and can use an encryption result as a third identification data ciphertext in the ciphertext subset; and can encrypt the business data in the plaintext subset by using a homomorphic encryption algorithm based on the third encryption key, and can use an encryption result as the business data ciphertext in the ciphertext subset. It is worthwhile to note that, the encryption algorithm used by the second data party when encrypting the identification data in the plaintext subset can be the same as the encryption algorithm used by the first data party in S101.

The third encryption key can be different from the second encryption key. Specifically, the second data party can generate a public/private key pair, and can use the public key in the public/private key pair as a third encryption key, and use the private key in the public/private key pair as a decryption key corresponding to the third encryption key.

In some implementations, considering the relatively large number of bits of the encryption result, if the encryption result of the identification data is directly used as the third identification data ciphertext in the fourth ciphertext set, communication traffic increases when the second data party sends the fourth ciphertext set to the first data party, and time overheads increase when the first data party calculates the intersection set (for a specific process, references are made to S115 in the following). For such reason, the second data party can encrypt the identification data in each plaintext subset by using an encryption algorithm based on the second encryption key; can obtain a code of the encryption result; and can use the code of the encryption result as the third identification data ciphertext in the ciphertext subset. The code can include, for example, a hash value, including but not limited to MD5, SHA1, SHA256, SHA384, SHA512, CRC32, etc. Certainly, the code can also include a code in another form, which is not specifically limited in the present implementation. The number of bits in the code of the encryption result is smaller than the number of bits of the encryption result, so that the number of bits of the third identification data ciphertext in the fourth ciphertext set can be reduced. For example, due to limitation of a security demand, the number of bits of the encryption result is at least 256, and the number of bits in a hash value of the encryption result can be 80.

S113: The second data party sends the fourth ciphertext set to the first data party.

In some implementations, the second data party can directly send the fourth ciphertext set to the first data party.

In some implementations, in order to increase security and prevent the first data party from learning a location relationship between ciphertext subsets in the fourth ciphertext set, the second data party can further disorder the ciphertext subsets in the fourth ciphertext set to obtain an out-of-order fourth ciphertext set; and can send the out-of-order fourth ciphertext set to the first data party.

S115: The first data party receives the fourth ciphertext set, and obtains the third identification data ciphertext common to the third ciphertext set and the fourth ciphertext set.

In some implementations, the second data party can directly send the fourth ciphertext set to the first data party, and the first data party can receive the fourth ciphertext set. Or, the second data party can further send the out-of-order fourth ciphertext set to the first data party, and the first data party can receive the out-of-order fourth ciphertext set.

In some implementations, the first data party can obtain an intersection set of the third ciphertext set and the fourth ciphertext set, and the intersection set can include the third identification data ciphertext common to the third ciphertext set and the fourth ciphertext set. Both the third identification data ciphertext in the third ciphertext set and the identification data ciphertext in the fourth ciphertext set are ciphertexts after first-time encryption. As such, the intersection set can be calculated based on the primary ciphertext.

S117: The first data party calculates a homomorphic addition result of a business data ciphertext corresponding to the common third identification data ciphertext.

In some implementations, each common third identification data ciphertext can correspond to a business data ciphertext in the fourth ciphertext set. As such, the first data party can obtain the business data ciphertext in the fourth ciphertext set corresponding to the third identification data ciphertext in the intersection set; and can calculate the homomorphic addition result of the obtained business data ciphertext.

The homomorphic addition result is the same as the encryption result of specific business data after homomorphic encryption. The specific business data can include business data corresponding to identification data common to the business dataset and the identification dataset. An operation method used to calculate the homomorphic addition result can be, for example, addition, multiplication, etc. Depending on different properties of the homomorphic encryption algorithm, specific operation methods used to calculate the homomorphic addition result can also be different. In an example scenario, the business data ciphertext in the fourth ciphertext set corresponding to the third identification data ciphertext in the intersection set can include $E(t_1)$, $E(t_2)$, and $E(t_3)$. Then the business data ciphertexts $E(t_1)$, $E(t_2)$, and $E(t_3)$ can be added together to obtain the homomorphic addition result $E(t_1+t_2+t_3)=E(t_1)+E(t_2)+E(t_2)+E(t_3)$. In another example scenario, the business data ciphertext in the fourth ciphertext set corresponding to the third identification data ciphertext in the intersection set can include $E(t_1)$, $E(t_2)$, and $E(t_3)$. Then, the business data ciphertexts $E(t_1)$, $E(t_2)$, and $E(t_3)$ can be multiplied to obtain the homomorphic addition result $E(t_1+t_2+t_3)=E(t_1)\times E(t_2)\times E(t_3)$.

S119: The first data party sends the homomorphic addition result to the second data party.

S121: The second data party receives the homomorphic addition result, and decrypts the homomorphic addition result to obtain a statistical indicator.

In some implementations, the first data party can send the homomorphic addition result to the second data party. The second data party can receive the homomorphic addition result, and can decrypt the homomorphic addition result based on the decryption key corresponding to the third encryption key to obtain the statistical indicator. The statistical indicator can include the sum of specific business data, and the specific business data can include business data corresponding to identification data common to the business dataset and the identification dataset.

Figure 2:
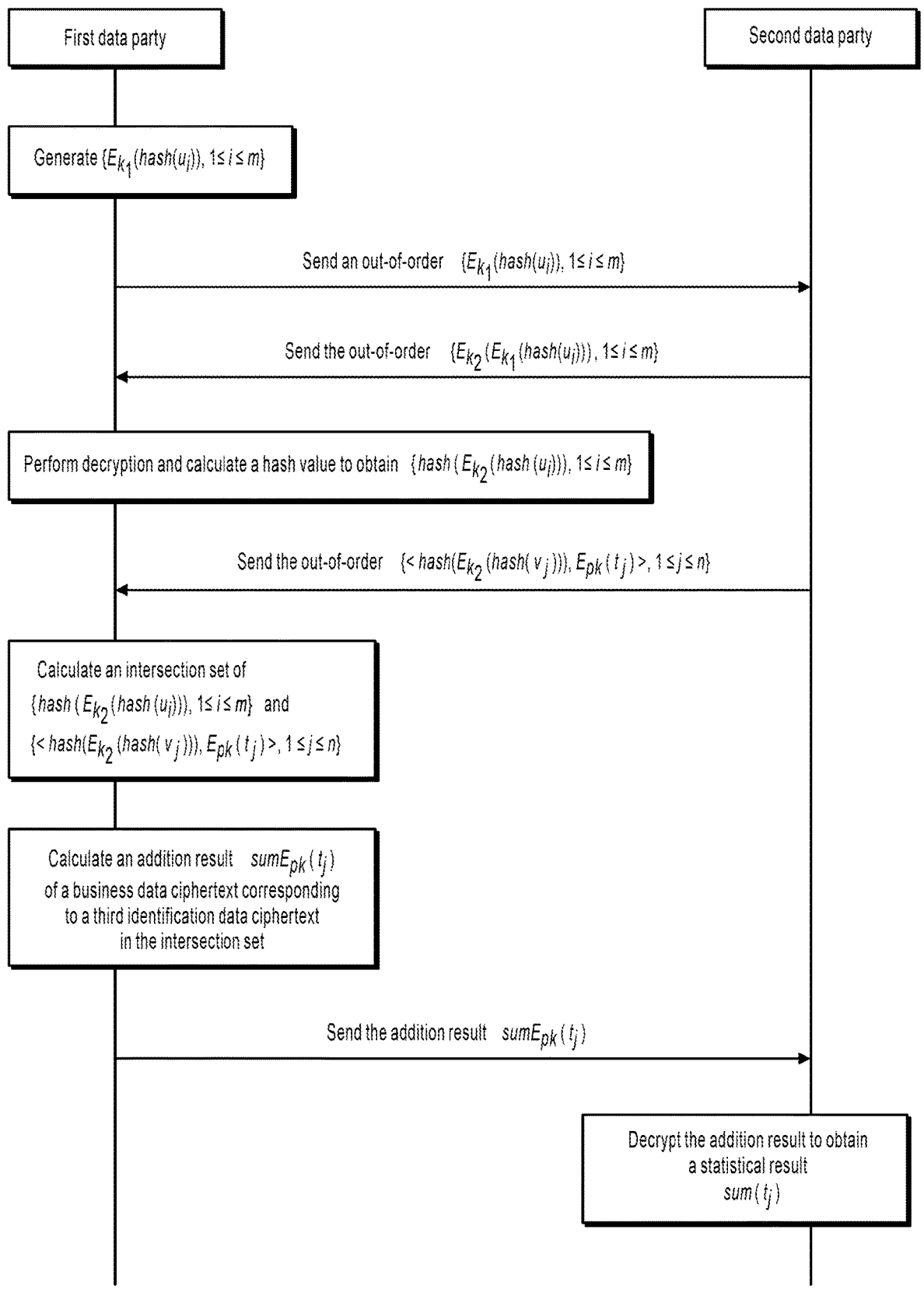
FIG. 2 is a schematic diagram illustrating an application scenario, according to an implementation of the present specification.

References are made to FIG. 2. The following describes an example application scenario of an implementation of the present specification.

The first data party can hold the identification dataset $\{u_i, 1\leq i\leq m\}$, where $u_i$ represents identification data and m represents an amount of identification data in the identification dataset. The first data party can generate a first encryption key $k_1$, and a decryption key corresponding to the first encryption key $k_1$ can be the first encryption key $k_1$ itself.

The second data party can hold a business dataset $\{<v_j, t_j>, 1\leq j\leq n\}$, where $<v_j, t_j>$ represents a plaintext subset, $v_j$ represents identification data, $t_j$ represents business data, and n represents the number of plaintext subsets in the business dataset. The second data party can generate a second encryption key $k_2$, and a decryption key corresponding to the second encryption key $k_2$ can be the second encryption key $k_2$ itself. The second data party can further generate a public/private key pair pk and sk, and can use the public key pk as a third encryption key, and use the private key sk as a decryption key corresponding to the third encryption key pk.

The first data party can obtain a hash value of the identification data in the identification dataset $\{u_i, 1\leq i\leq m\}$; can encrypt the hash value of the identification data based on the first encryption key $k_1$; and can use an encryption result as the first identification data ciphertext in the first ciphertext set. The first ciphertext set can be represented as $\{E_{k_1}(hash(u_i)), 1\leq i\leq m\}$, where $E_{k_1}(hash(u_i))$ represents the first identification data ciphertext. The first data party can disorder the first identification data ciphertexts in the first ciphertext set to obtain an out-of-order first ciphertext set; and can send the out-of-order first ciphertext set to the second data party.

The second data party can receive the out-of-order first ciphertext set; can encrypt each first identification data ciphertext in the first ciphertext set based on the second encryption key $k_2$; and can use an encryption result as the second identification data ciphertext in the second ciphertext set. The second ciphertext set can be represented as $\{E_{k_2}(E_{k_1}(hash(u_i))), 1\leq i\leq m\}$, where $E_{k_2}(E_{k_1}(hash(u_i)))$ represents the second identification data ciphertext. The second data party can disorder the second identification data ciphertexts in the second ciphertext set to obtain an out-of-order second ciphertext set; and can send the out-of-order second ciphertext set to the first data party.

The first data party can receive the out-of-order second ciphertext set; can decrypt each second identification data ciphertext in the second ciphertext set based on a decryption key corresponding to the first encryption key $k_1$; can obtain a hash value of a decryption result; and can use the hash value of the decryption result as the third identification data ciphertext in the third ciphertext set. The third ciphertext set can be represented as $\{hash(E_{k_2}(hash(u_i))), 1\leq i\leq m\}$, where $hash(E_{k_2}(hash(u_i)))$ represents the third identification data ciphertext and $E_{k_2}(hash(u_i))$ represents a decryption result of decrypting the second identification data ciphertext.

The second data party can generate a fourth ciphertext set based on the business dataset $\{<v_j, t_j>, 1\leq j\leq n\}$. The fourth ciphertext set can be represented as $\{<hash(E_{k_2}(hash(v_j))), E_{pk}(t_j)>, 1\leq j\leq n\}$, where $<hash(E_{k_2}(hash(v_j))), E_{pk}(t_j)>$ represents a ciphertext subset, $hash(E_{k_2}(hash(v_j)))$ represents the third identification data ciphertext, $E_{pk}(t_j)$ represents a business data ciphertext, and $E_{pk}(t_j)$ is specifically a homomorphic ciphertext. The second data party can disorder the ciphertext subsets in the fourth ciphertext set to obtain an out-of-order fourth ciphertext set; and can send the out-of-order fourth ciphertext set to the first data party.

The first data party can receive the out-of-order fourth ciphertext set; can obtain the intersection set of the third ciphertext set and the fourth ciphertext set; can calculate the homomorphic addition result $sumE_{pk}(t_j)$ of the business data ciphertext corresponding to the third identification data ciphertext in the intersection set; and can send the homomorphic addition result $sumE_{pk}(t_j)$ to the second data party.

The second data party can receive the homomorphic addition result, and can decrypt the homomorphic addition result based on the decryption key sk corresponding to the third encryption key pk to obtain the statistical indicator $sum(t_j)$.

In the present implementation, the first data party and the second data party can jointly complete data indicator statistics without leaking their own data. In addition, in the present implementation, the first data party can calculate the intersection set based on the primary ciphertext of the identification data without leaking its own identification dataset, and the second data party can calculate the intersection set based on the primary ciphertext of the identification data without leaking its own business dataset. The second data party can then obtain the statistical indicator based on the intersection set. Because the intersection set is calculated based on the primary ciphertext of the identification data, on the one hand, the data is not leaked and the security is high; on the other hand, the calculation amount can be reduced (for example, the first data party does not need to re-encrypt the third identification data ciphertext in the fourth ciphertext set).

Figure 3:
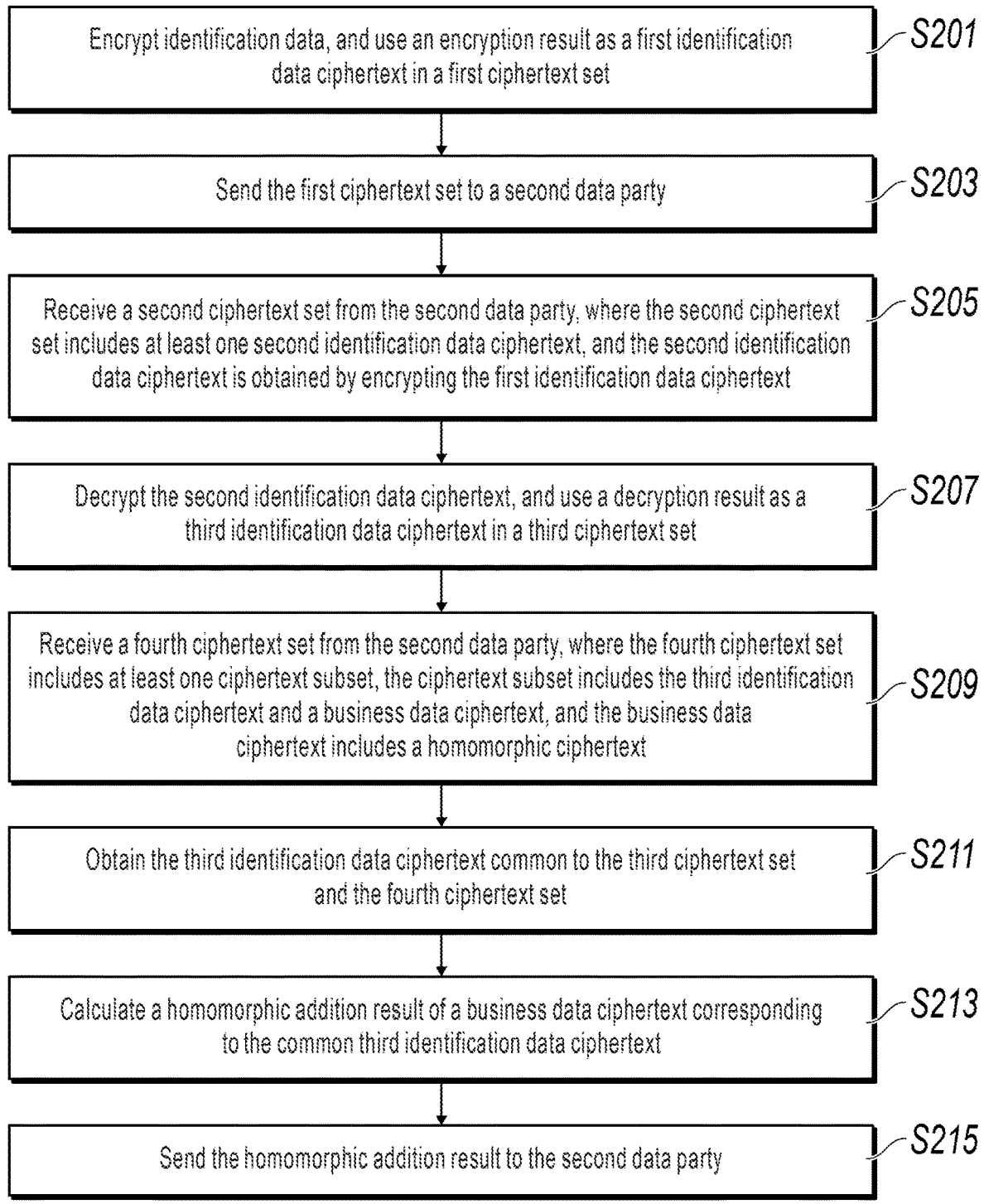
FIG. 3 is a flowchart illustrating a data processing method, according to an implementation of the present specification.

Based on the same idea, the present specification further provides an implementation of another data processing method. References are made to FIG. 3. In the present implementation, the first data party holding an identification dataset serves as an execution body, and the identification dataset can include at least one piece of identification data. The implementation can include the following steps.

S201: Encrypt identification data, and use an encryption result as a first identification data ciphertext in a first ciphertext set.

In some implementations, the first data party can generate an encryption key; can encrypt each piece of identification data in the identification dataset by using an encryption algorithm based on the encryption key; and can use an encryption result as a first identification data ciphertext in a first ciphertext set.

In some implementations, the first data party can obtain a code of identification data in the identification dataset; can encrypt the code of the identification data; and can use an encryption result as a first identification data ciphertext in the first ciphertext set.

S203: Send the first ciphertext set to a second data party.

In some implementations, the first data party can directly send the first ciphertext set to the second data party.

In some implementations, the first data party can further disorder the first identification data ciphertexts in the first ciphertext set to obtain an out-of-order first ciphertext set; and can send the out-of-order first ciphertext set to the second data party.

S205: Receive a second ciphertext set from the second data party, where the second ciphertext set includes at least one second identification data ciphertext, and the second identification data ciphertext is obtained by encrypting the first identification data ciphertext.

In some implementations, the second data party can receive the first ciphertext set; can encrypt the first identification data ciphertext in the first ciphertext set; can use an encryption result as a second identification data ciphertext in a second ciphertext set; and can send the second ciphertext set to the first data party. The first data party can receive the second ciphertext set.

S207: Decrypt the second identification data ciphertext, and use a decryption result as a third identification data ciphertext in a third ciphertext set.

In some implementations, the first data party can decrypt each second identification data ciphertext in the second ciphertext set based on a decryption key corresponding to the encryption key; and can use a decryption result as the third identification data ciphertext in the third ciphertext set.

In some implementations, the first data party can decrypt each second identification data ciphertext in the second ciphertext set based on a decryption key corresponding to the encryption key; can obtain a code of a decryption result; and can use the code of the decryption result as the third identification data ciphertext in the third ciphertext set.

S209: Receive a fourth ciphertext set from the second data party, where the fourth ciphertext set includes at least one ciphertext subset, the ciphertext subset includes the third identification data ciphertext and a business data ciphertext, and the business data ciphertext includes a homomorphic ciphertext.

In some implementations, the second data party can generate a fourth ciphertext set based on the business dataset. For a specific generation process, references can be made to the related description in S111. The second data party can send the fourth ciphertext set to the first data party. The first data party can receive the fourth ciphertext set.

S211: Obtain the third identification data ciphertext common to the third ciphertext set and the fourth ciphertext set.

In some implementations, the first data party can obtain an intersection set of the third ciphertext set and the fourth ciphertext set, and the intersection set includes the third identification data ciphertext common to the third ciphertext set and the fourth ciphertext set.

S213: Calculate a homomorphic addition result of a business data ciphertext corresponding to the common third identification data ciphertext.

S215: Send the homomorphic addition result to the second data party.

In the present implementation, by interacting with the second data party, the first data party can obtain the third ciphertext set and the fourth ciphertext set; can obtain the third identification data ciphertext common to the third ciphertext set and the fourth ciphertext set; can calculate the homomorphic addition result of the business data ciphertext corresponding to the common third identification data ciphertext; and can send the homomorphic addition result to the second data party. As such, the second data party obtains the statistical indicator based on the homomorphic addition result.

Figure 4:
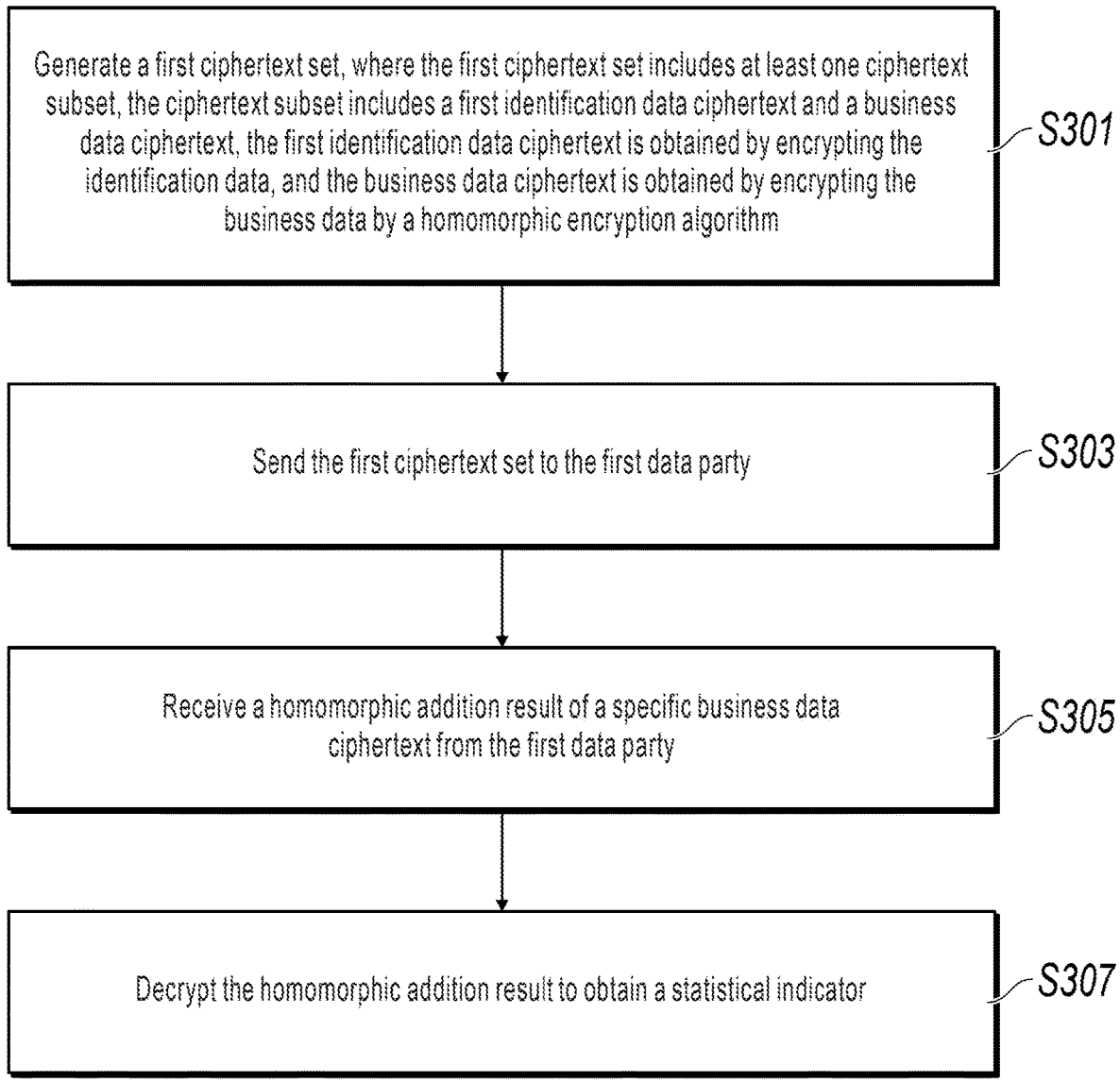
FIG. 4 is a flowchart illustrating a data processing method, according to an implementation of the present specification.

Based on the same inventive concept, the present specification further provides an implementation of another data processing method. References are made to FIG. 4. In the present implementation, the second data party holding a business dataset serves as an execution body, the business dataset can include at least one plaintext subset, and the plaintext subset can include identification data and business data. The implementation can include the following steps.

S301: Generate a first ciphertext set, where the first ciphertext set includes at least one ciphertext subset, the ciphertext subset includes a first identification data ciphertext and a business data ciphertext, the first identification data ciphertext is obtained by encrypting the identification data, and the business data ciphertext is obtained by encrypting the business data by a homomorphic encryption algorithm.

In some implementations, the second data party can generate a first ciphertext set based on the business dataset. For a specific generation process, references can be made to the related process of generating the fourth ciphertext set in S111.

S303: Send the first ciphertext set to the first data party.

In some implementations, the second data party can directly send the first ciphertext set to the first data party.

In some implementations, the second data party can further disorder the ciphertext subsets in the first ciphertext set to obtain an out-of-order first ciphertext set; and can send the out-of-order first ciphertext set to the first data party.

S305: Receive a homomorphic addition result of a specific business data ciphertext from the first data party.

S307: Decrypt the homomorphic addition result to obtain a statistical indicator.

In some implementations, the second data party can further receive a second ciphertext set from the first data party. The second ciphertext set can include at least one second identification data ciphertext, and the second identification data ciphertext is obtained by encrypting the identification data held by the first data party. The second data party can encrypt the second identification data ciphertext; can use an encryption result as the third identification data ciphertext in the third ciphertext set; and can send the third ciphertext set to the first data party so that the first data party generates a fourth ciphertext set based on the third ciphertext set. The fourth ciphertext set can include at least one first identification data ciphertext. The second data party can directly send the third ciphertext set to the first data party. Or, the second data party can further disorder the third identification data ciphertexts in the third ciphertext set to obtain an out-of-order third ciphertext set; and can send the out-of-order third ciphertext set to the first data party. The specific business data ciphertext can include a business data ciphertext corresponding to the first identification data ciphertext common to the first ciphertext set and the fourth ciphertext set.

It is worthwhile to note that, for the first ciphertext set, the second ciphertext set, the third ciphertext set, and the fourth ciphertext set in the present implementation, references can be made to the descriptions of the first ciphertext set, the second ciphertext set, the third ciphertext set, and the fourth ciphertext set in the corresponding implementation in FIG. 1, respectively.

In the present implementation, by interacting with the first data party, the second data party can obtain a homomorphic addition result. The homomorphic addition result can be decrypted to obtain statistical indicators.

Figure 5:
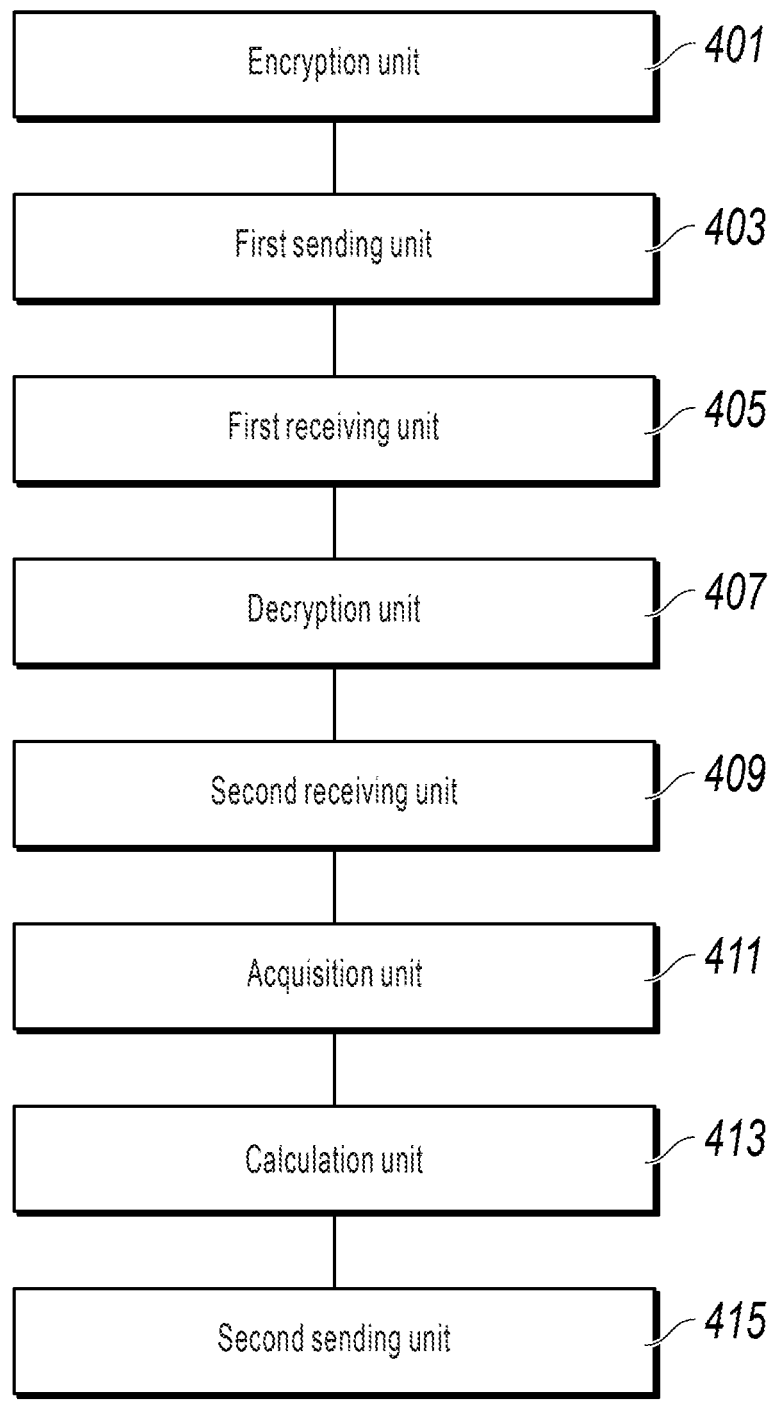
FIG. 5 is a schematic diagram illustrating a functional structure of a data processing apparatus, according to an implementation of the present specification.

Based on the same inventive concept, the present specification further provides an implementation of a data processing apparatus. References are made to FIG. 5. The present implementation can be applied to a first data party holding an identification dataset, and the identification dataset can include at least one piece of identification data. The implementation can include the following units: an encryption unit 401, configured to encrypt identification data, and use an encryption result as a first identification data ciphertext in a first ciphertext set; a first sending unit 403, configured to send the first ciphertext set to a second data party; a first receiving unit 405, configured to receive a second ciphertext set from the second data party, where the second ciphertext set includes at least one second identification data ciphertext, and the second identification data ciphertext is obtained by encrypting the first identification data ciphertext; a decryption unit 407, configured to decrypt the second identification data ciphertext, and use a decryption result as a third identification data ciphertext in a third ciphertext set; a second receiving unit 409, configured to receive a fourth ciphertext set from the second data party, where the fourth ciphertext set includes at least one ciphertext subset, the ciphertext subset includes the third identification data ciphertext and a business data ciphertext, and the business data ciphertext includes a homomorphic ciphertext; an acquisition unit 411, configured to obtain the third identification data ciphertext common to the third ciphertext set and the fourth ciphertext set; a calculation unit 413, configured to calculate a homomorphic addition result of a business data ciphertext corresponding to the common third identification data ciphertext; and a second sending unit 415, configured to send the homomorphic addition result to the second data party.

Figure 6:
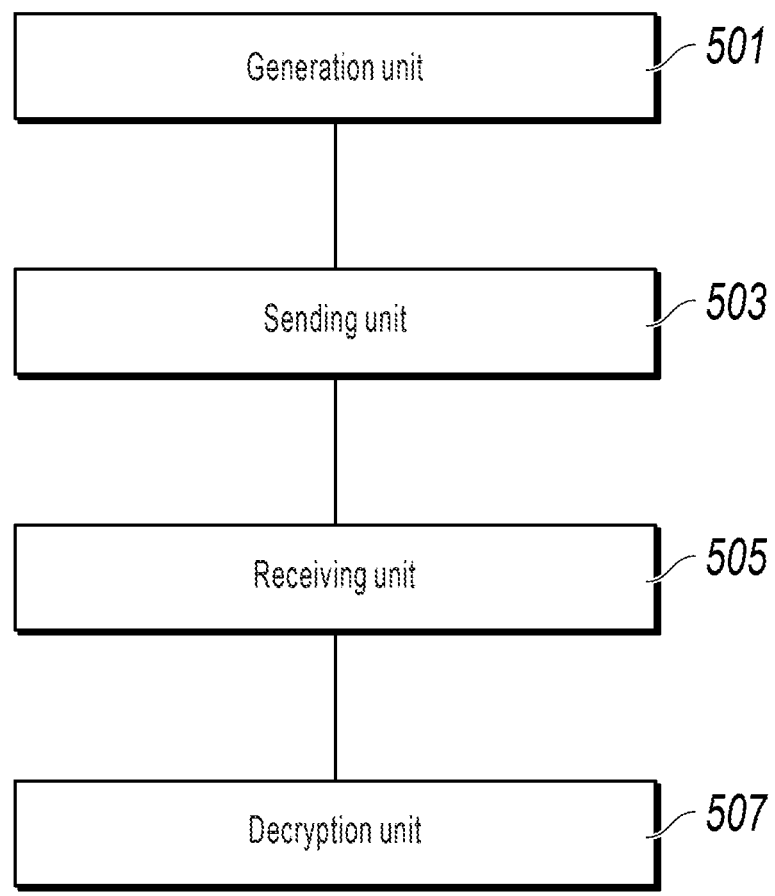
FIG. 6 is a schematic diagram illustrating a functional structure of a data processing apparatus, according to an implementation of the present specification.

Based on the same inventive concept, the present specification further provides an implementation of another data processing apparatus. References are made to FIG. 6. The present implementation can be applied to a second data party holding a business dataset, the business dataset can include at least one plaintext subset, and the plaintext subset can include identification data and business data. The implementation can include the following units: a generation unit 501, configured to generate a first ciphertext set, where the first ciphertext set includes at least one ciphertext subset, the ciphertext subset includes a first identification data ciphertext and a business data ciphertext, the first identification data ciphertext is obtained by encrypting the identification data, and the business data ciphertext is obtained by encrypting the business data by a homomorphic encryption algorithm; a sending unit 503, configured to send the first ciphertext set to a first data party; a receiving unit 505, configured to receive a homomorphic addition result of a specific business data ciphertext from the first data party; and a decryption unit 507, configured to decrypt the homomorphic addition result to obtain a statistical indicator.

Figure 7:
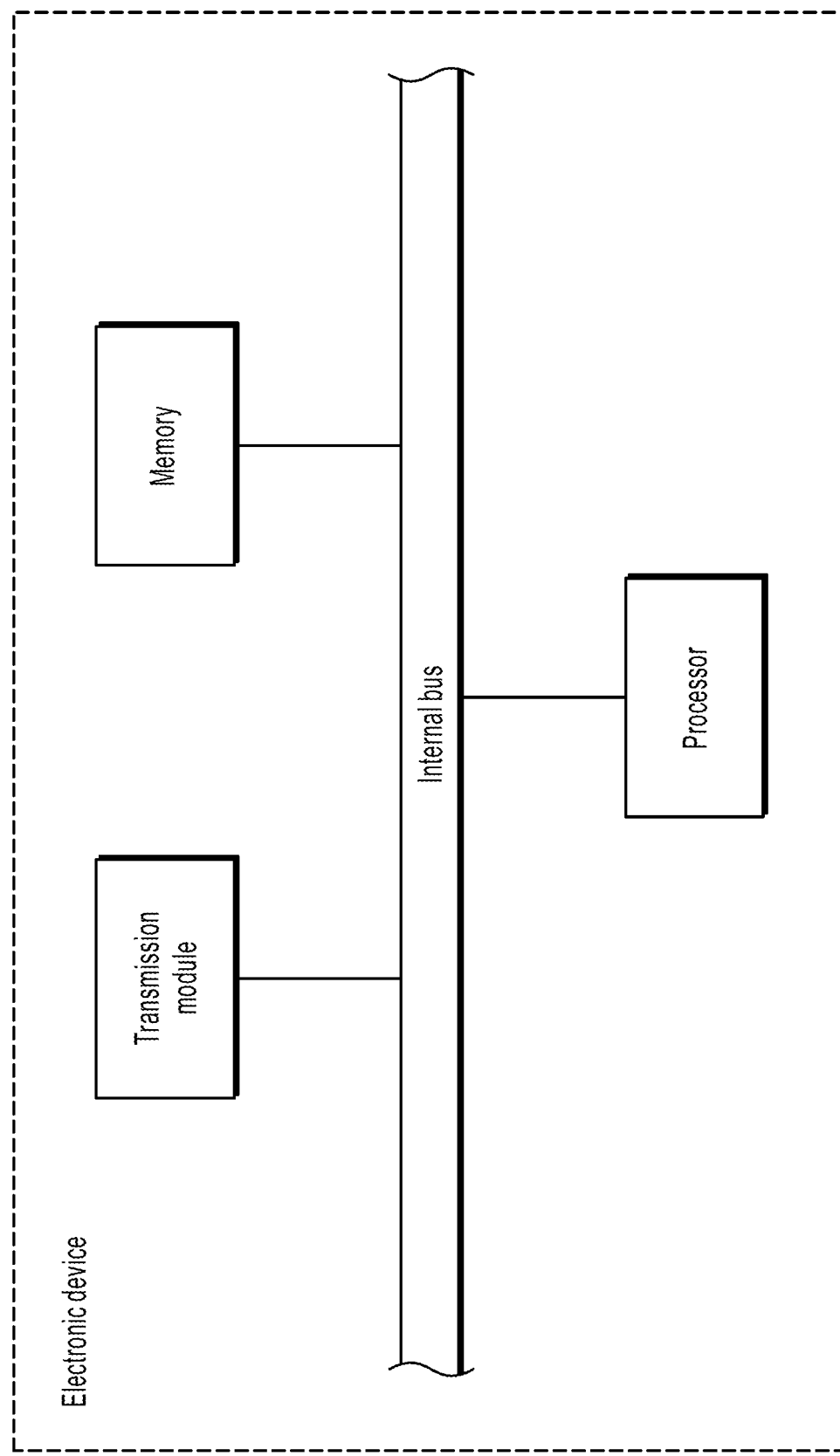
FIG. 7 is a schematic diagram illustrating a functional structure of an electronic device, according to an implementation of the present specification.

The following describes an implementation of an electronic device in the present specification. FIG. 7 is a schematic diagram of a hardware structure of an electronic device in the implementation. As shown in FIG. 7, the electronic device can include one or more processors (only one processor is shown in the figure), one or more memories, and one or more transmission modules. Certainly, a person of ordinary skill in the art can understand that the hardware structure shown in FIG. 7 is merely an example, and does not limit the hardware structure of the previous electronic device. In practice, the electronic device can further include more or less components or units than those shown in FIG. 7, or can have a configuration different from that shown in FIG. 7.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the electronic device by using a network such as the Internet, an intranet, a local area network, or a mobile communications network. The memory can be configured to store a program instruction or module of application software, for example, at least one of a program instruction or module of the implementation corresponding to FIG. 3, or a program instruction or module of the implementation corresponding to FIG. 4 in the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

It is worthwhile to note that the implementations in the present specification are progressively described, for the same or similar parts in some implementations, references can be made to each other, and each implementation focuses on a difference from other implementations. In particular, the apparatus implementation and the electronic device implementation are basically similar to the method implementation, and therefore are described briefly; for related parts, references can be made to the related descriptions in the method implementation. In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in some implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable user electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method for a first data party and a second data party to jointly and securely compute an aggregated result from user data stored by the second data party for a set of users whose membership is maintained by the first data party without the second data party being exposed to the membership of the set and without the first data party being exposed to the user data, the method comprising:
    encrypting, by the first data party, identification data representing membership in the set of users, to generate a first identification data ciphertext;
    sending, by the first data party to the second data party, the first identification data ciphertext representing membership in the set of users;
    receiving, by the first data party from the second data party, a second identification data ciphertext obtained by the second data party encrypting the first identification data ciphertext;
    performing, by the first data party, a homomorphic decryption process on the second identification data ciphertext to generate a third identification data ciphertext representing the membership of the set encrypted by the second data party but not by the first data party;
    receiving, by the first data party, from the second data party, a ciphertext set, the ciphertext set comprising encrypted identification data stored by the second data party, homomorphically encrypted user data stored by the second data party, and mappings between identities in the encrypted identification data and corresponding encrypted user data;
    calculating, by the first data party, an intersection set of the encrypted identification data and the third identification data ciphertext;
    calculating, by the first data party, a homomorphic addition result of encrypted user data mapped to the intersection set; and
    sending, by the first data party, the homomorphic addition result to the second data party, the homomorphic addition result being decryptable by the second data party to obtain the aggregated result.

2. The computer-implemented method of claim 1, wherein encrypting the identification data representing membership in the set of users comprises:
    obtaining an encoded value of the identification data; and
    encrypting the encoded value of the identification data.

3. The computer-implemented method of claim 1,
    wherein the first data party holds an encryption key;
    wherein encrypting the identification data representing membership in the set of users comprises encrypting the identification data using the encryption key; and
    wherein performing the homomorphic decryption process comprises decrypting the second identification data ciphertext using a decryption key corresponding to the encryption key.

4. The computer-implemented method of claim 1, wherein performing the homomorphic decryption process comprises:
    decrypting the second identification data ciphertext to obtain a decryption result; and encoding the decryption result, the encoded decryption result being the third identification data ciphertext.

5. The computer-implemented method of claim 4, wherein encoding the decryption result comprises hashing the decryption result.

6. The computer-implemented method of claim 1, wherein sending the first identification data ciphertext to the second data party comprises:
reordering data elements in the first identification data ciphertext to obtain an out-of-order first identification data ciphertext; and
sending the out-of-order first identification data ciphertext to the second data party.

7. A non-transitory, computer-readable medium storing one or more instructions executable by a computer system to perform operations for a first data party and a second data party to jointly and securely compute an aggregated result from user data stored by the second data party for a set of users whose membership is maintained by the first data party without the second data party being exposed to the membership of the set and without the first data party being exposed to the user data, the operations comprising
encrypting, by the first data party, identification data representing membership in the set of users, to generate a first identification data ciphertext;
sending, by the first data party to the second data party, the first identification data ciphertext representing membership in the set of users;
receiving, by the first data party from the second data party, a second identification data ciphertext obtained by the second data party encrypting the first identification data ciphertext;
performing, by the first data party, a homomorphic decryption process on the second identification data ciphertext to generate a third identification data ciphertext representing the membership of the set encrypted by the second data party but not by the first data party;
receiving, by the first data party, from the second data party, a ciphertext set, the ciphertext set comprising encrypted identification data stored by the second data party, homomorphically encrypted user data stored by the second data party, and mappings between identities in the encrypted identification data and corresponding encrypted user data;
calculating, by the first data party, an intersection set of the encrypted identification data and the third identification data ciphertext;
calculating, by the first data party, a homomorphic addition result of encrypted user data mapped to the intersection set; and
sending, by the first data party, the homomorphic addition result to the second data party, the homomorphic addition result being decryptable by the second data party to obtain the aggregated result.

8. The non-transitory, computer-readable medium of claim 7, wherein encrypting the identification data representing membership in the set of users comprises:
obtaining an encoded value of the identification data; and
encrypting the encoded value of the identification data.

9. The non-transitory, computer-readable medium of claim 7,
wherein the first data party holds an encryption key;
wherein encrypting the identification data representing membership in the set of users comprises encrypting the identification data using the encryption key; and
wherein performing the homomorphic decryption process comprises decrypting the second identification data ciphertext using a decryption key corresponding to the encryption key.

10. The non-transitory, computer-readable medium of claim 7, wherein performing the homomorphic decryption process comprises:
decrypting the second identification data ciphertext to obtain a decryption result; and
encoding the decryption result, the encoded decryption result being the third identification data ciphertext.

11. The non-transitory, computer-readable medium of claim 10, wherein encoding the decryption result comprises hashing the decryption result.

12. The non-transitory, computer-readable medium of claim 7, wherein sending the first identification data ciphertext to the second data party comprises:
reordering data elements in the first identification data ciphertext to obtain an out-of-order first identification data ciphertext; and
sending the out-of-order first identification data ciphertext to the second data party.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for a first data party and a second data party to jointly and securely compute an aggregated result from user data stored by the second data party for a set of users whose membership is maintained by the first data party without the second data party being exposed to the membership of the set and without the first data party being exposed to the user data, the operations comprising:
encrypting, by the first data party, identification data representing membership in the set of users, to generate a first identification data ciphertext;
sending, by the first data party to the second data party, the first identification data ciphertext representing membership in the set of users;
receiving, by the first data party from the second data party, a second identification data ciphertext obtained by the second data party encrypting the first identification data ciphertext;
performing, by the first data party, a homomorphic decryption process on the second identification data ciphertext to generate a third identification data ciphertext representing the membership of the set encrypted by the second data party but not by the first data party;
receiving, by the first data party, from the second data party, a ciphertext set, the ciphertext set comprising encrypted identification data stored by the second data party, homomorphically encrypted user data stored by the second data party, and mappings between identities in the encrypted identification data and corresponding encrypted user data;
calculating, by the first data party, an intersection set of the encrypted identification data and the third identification data ciphertext;
calculating, by the first data party, a homomorphic addition result of encrypted user data mapped to the intersection set; and
sending, by the first data party, the homomorphic addition result to the second data party, the homomorphic addition result being decryptable by the second data party to obtain the aggregated result.

14. The computer-implemented system of claim 13, wherein encrypting the identification data representing membership in the set of users comprises:
    obtaining an encoded value of the identification data; and
    encrypting the encoded value of the identification data.

15. The computer-implemented system of claim 13,
    wherein the first data party holds an encryption key;
    wherein encrypting the identification data representing membership in the set of users comprises encrypting the identification data using the encryption key; and
    wherein performing the homomorphic decryption process comprises decrypting the second identification data ciphertext using a decryption key corresponding to the encryption key.

16. The computer-implemented system of claim 13, wherein performing the homomorphic decryption process comprises:
    decrypting the second identification data ciphertext to obtain a decryption result; and
    encoding the decryption result, the encoded decryption result being the third identification data ciphertext.

17. The computer-implemented system of claim 16, wherein encoding the decryption result comprises hashing the decryption result.

18. The computer-implemented system of claim 13, wherein sending the first identification data ciphertext to the second data party comprises:
    reordering data elements in the first identification data ciphertext to obtain an out-of-order first identification data ciphertext; and
    sending the out-of-order first identification data ciphertext to the second data party.

* * * * *